United States Patent [19]

Baciak et al.

[11] Patent Number: 5,196,774
[45] Date of Patent: Mar. 23, 1993

[54] DIGITAL SERVO SYSTEM

[75] Inventors: Mark G. Baciak, West Melbourne; Christina Padgett, Indialantic, both of Fla.; Craig A. Baer, Colorado Springs, Colo.

[73] Assignee: The United States of America as represented by the Secretary of the Air Force, Washington, D.C.

[21] Appl. No.: 733,493

[22] Filed: Jul. 22, 1991

[51] Int. Cl.⁵ .............................................. G05B 19/18
[52] U.S. Cl. ..................................... 318/569; 318/560; 318/574; 343/766
[58] Field of Search ................... 343/757, 763, 766; 318/569, 574, 560, 582, 626, 627; 359/877

[56] References Cited

U.S. PATENT DOCUMENTS

| | | | |
|---|---|---|---|
| 4,647,939 | 3/1987 | Kolhoff | 318/766 X |
| 4,792,737 | 12/1988 | Goff et al. | 318/560 |
| 4,859,920 | 8/1989 | Kurakake et al. | 318/569 |
| 4,882,528 | 11/1989 | Sogabe et al. | 318/574 |
| 4,920,350 | 4/1990 | McGuire et al. | 343/766 X |
| 4,950,063 | 8/1990 | Pohle et al. | 350/571 |
| 4,968,923 | 11/1990 | Busujima | 318/560 |
| 5,077,507 | 12/1991 | Mitani et al. | 318/569 |
| 5,079,490 | 1/1992 | Kita et al. | 318/569 |
| 5,091,860 | 2/1992 | Fujimoto | 318/569 |

Primary Examiner—William M. Shoop, Jr.
Assistant Examiner—Karen Masih
Attorney, Agent, or Firm—William G. Auton; Donald J. Singer

[57] ABSTRACT

A digital servomechanism and control system which can be used to adjustably point massive structures to increments of microaradians is disclosed. This system includes: a rotating pedestal which is mounted on a gimbal, a high torque motor, a high current amplifier, encoder, a digital-to-analog (D/A) converter, a mount dynamics unt, a summing junction, a rate control unit, a controller unit, a D/P unit, and a Micro Vax computer.

10 Claims, 8 Drawing Sheets

Microfiche Appendix Included
(1 Microfiche, 10 Pages)

FIG. 1

SIMPLIFIED MOUNT CONTROL BLOCK DIAGRAM

FIG. 2

FUNCTIONAL BLOCK DIAGRAM OF AN ANALOG SERVO

FIG. 4

SIMPLIFIED MOUNT CONTROL BLOCK DIAGRAM FOR ANALOG SERVO

SIMPLIFIED BLOCK DIAGRAM FOR DUAL SERVO SYSTEM

FIG. 7

FAILSAFE CIRCUIT BLOCK DIAGRAM

DIGITAL SERVO SYSTEM

STATEMENT OF GOVERNMENT INTEREST

The invention described herein may be manufactured and used by or for the Government for governmental purposes without the payment of any royalty thereon.

REFERENCE TO MICROFICHE APPENDIX

Reference is made to the microfiche appendix which contains the digital servo system source code, and includes 1 fiche containing 10 pages.

BACKGROUND OF THE INVENTION

The present invention relates generally to systems which control the pointing of mechanical structures such as radar antennas and beam steering mirrors, and more specifically to a digitally controlled servomechanism.

In the world of mount control technology, it is a well known fact that controlling massive structures to a few microradians requires special compensation. Until now, the requirement to position mounts to this precision has forced the rate feedback, mount dynamics compensation, and error correction control to be performed with analog technology. Although analog servos do indeed perform well, their limitations are also well known. Frequent adjustments of their designs are necessary to maintain precision of operation. These adjustments are extremely time-consuming since the design is implemented in circuitry.

Mount control systems have successfully used analog servo systems as the primary means of control because of their proven ability to position the mount with microradian precision. Since the invention of the computer, many have also tried (unsuccessfully) to transfer this analog task to the computer. While digital filter technology has been available for quite a long time, computer technology has only recently become cost effective and capable enough to make digital filters an economic alternative to analog filters.

The task of implementing digital filter technology to digitally control servomechanisms is alleviated, to some extent, by the systems disclosed in the following U.S. Patents, the disclosures of which are incorporated herein by reference:

U.S. Pat. No. 4,950,063 issued to Pohle et al.

SUMMARY OF THE INVENTION

The present invention includes a digital servomechanism and control system to adjustably point massive structures such as radar antennas and beam steering mirrors. One embodiment of the invention includes a rotating axis which is mounted on a gimbal, a high torque motor, a high current amplifier an encoder, a digital-to-analog (D/A) converter, a mount dynamics package, a summing junction, a rate control package, a controller package, a D/P unit, and a Micro Vax computer.

The Micro Vax computer contains all the real time software needed to allow the system's users to send commands that direct the high torque motor to rotate the axis of the gimbal as required.

The encoder measures the actual position of the pedestal and outputs a digital signal to both the computer and the D/P unit. The computer is thereby able to monitor the actual position of the pedestal and ensure that it corresponds to the position requested by the users of the system.

The D/P unit is a subroutine component which calculates the derivative between successive position measurements to calculate thereby a rate measurement which indicates the rate of change of position of the pedestal.

The rate control package receives and compares the actual rate measurement from the D/P unit with a rate limit to output thereby a rate error signal to the summing junction. The rate limit is a value which indicates the limit that the pedestal axis is allowed to be rotated on the gimbal.

The controller unit is an integrator circuit which integrates the acceleration value which is output by the Micro Vax computer to produce thereby a velocity signal which indicates the rate that the high torque is directed to move to satisfy the user's commands. The summing junction receives and subtracts the rate error signal from the rate control circuit from the velocity signal from the controller unit to produce thereby a velocity command signal which is: forwarded by the mount dynamics package; converted into analog by the D/A converter; and amplified by the high current amplifier into a drive signal for the high torque motor.

Digital control of rotating structures is superior to analog control in a number of respects. Digital Control Systems are less susceptible to thermal influences, and allow precisions of control to within 2-5 microradians of tracking accuracy. Digital control systems incorporate the rapid data processing speeds of microprocessors, and use commercial off-the-shelf components. In fact, all of the components described above are commercial components which are listed in the T.M.S. Family Development Support Reference Guide catalog issued by Texas Instruments in 1989.

It is an object of the present invention to provide a digital servo system which digitally controls the position of massive rotating structures.

It is another object of the present invention to provide a digital servo system which controls the position of rotating structures within 2-5 microradians, and which is immune to the effects of temperature and time.

It is another object of the present invention to provide a digital servo system which uses commercial off-the-shelf equipment.

These together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a digital servomechanism and control system. The reader's attention is now directed towards FIG. 1, which is a block diagram of an embodiment of the present invention which includes: a rotating axis which is mounted on a gimbal 100, a high torque motor 101, a high current amplifier 102, an encoder 109, a digital-to-analog (D/A) converter 103, a mount dynamics package 104, a summing junction 105, a rate control package 106, a controller package 107, a D/P unit 108, and a Micro Vax computer 110.

Figure 1:
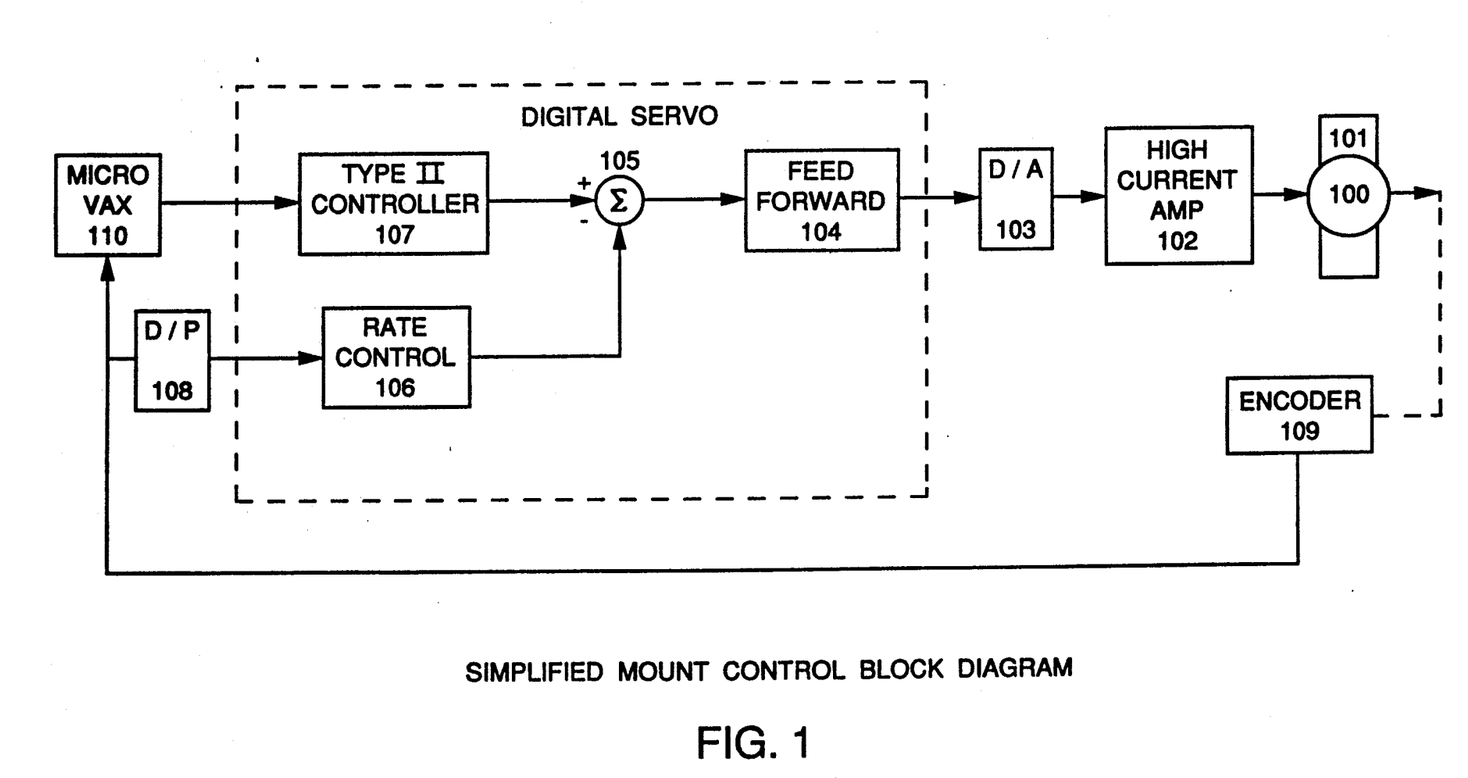
FIG. 1 is a block diagram of the present invention.

The gimbal mechanism 100 is believed to be known in the art and completely described in references such as U.S. Pat. No. 4,950,063 issued to Richard Pohle et al. The Pohle et al patent includes a description of a gimbaled phased array telescope which includes a massive array which is mounted on a pedestal which is rotated by a motor drive and gear mechanism. Similarly, the high torque motor 101 of FIG. 1 is known in the art, and need not be described in great detail.

The Micro Vax computer 110 contains all the real time software needed to allow the system's users to send commands that direct the high torque motor 101 to rotate the gimbal 100 as required.

The encoder 109 measure s the actual position of the pedestal and outputs a digital signal to both the computer 110 and the D/P unit 108. The computer 110 is thereby able to monitor the actual position of the pedestal, and ensure that it corresponds to the position requested by the users of the system.

The D/P unit 108 is subroutine component which calculates the derivative between successive position measurements to calculate thereby a rate measurement which indicates the rate of change of position of the pedestal on the gimbal 100.

The rate control unit 106 receives and compares the actual rate measurement from the D/P unit 108 with a rate limit to output thereby a rate error signal to the summing junction 105. The rate limit is a value which indicates the limit that the axis is allowed to be rotated on the gimbal 100.

The controller unit 107 is an integrator circuit which integrates the acceleration value which is output by the Micro Vax computer 110 to produce thereby a velocity signal which the motor 101 is directed to move to satisfy the user's commands. The summing junction 105 receives and subtracts the rate error signal from the rate control unit 106 from the velocity signal from the controller unit 10 to produce thereby a velocity command signal which is forwarded to the mount dynamics unit 104; converted into analog by the D/A converter 103; and amplified by the high current amplifier 102 into a drive signal for the high torque motor 100.

The mount dynamics unit 104 of FIG. 1 is a low pass filter that is an optional element in the invention. The purpose of this filter is to allow the user to impose an additional limit on the velocity command signal produced by the summing junction 105. This additional limit represents the limits of the velocity dynamics that are characteristic of the high torque motor 101 and serve as a system safeguard that reinforces the affects of the rate control unit 106.

The digital servo control system of FIG. 1 is designed to replace existing analog servo control systems using a Micro Vax computer and a TMS320C25 digital signal processor board listed in the above-cited Texas Instruments catalog. The present invention takes advantage of Digital Signal Processor (DSP) technology. The processing speed of the TMS320C25 allows algorithms to be processed at a rate such that the resultant output approaches that of an analog controller. FIG. 1 is a simplified block diagram of the implemented digital servo. While this figure shows control for only one axis, both axes are controlled with identical algorithms. An analog servo system for implementing a two axis system requires an additional set of analog servo hardware. The digital servo. takes advantage of proven analog architecture in its implementation. In FIG. 1, the structure shows an 'inner loop' responsible for rate control and 'outer loop' responsible for position control. The inner loop for the digital servo takes the first derivative of mount position data to develop velocity, (i.e. if P=position and V=velocity then dP/dt=V). The analog servo uses an electro-mechanical tachometer to obtain velocity information. The outer loop is controlled by the microvax host computer in either an analog or digital servo. The position loop can be either commanded velocity or acceleration. The commanded velocity case is a Type I command. This means that the control law is satisfied by supplying a rate input and bypassing the integrator. Similarly, Type II commands are acceleration commands and require integration to satisfy the control law. The Type I or II command is determined and commanded by the Micro Vax based on operator input and mount performance.

Figure 2:
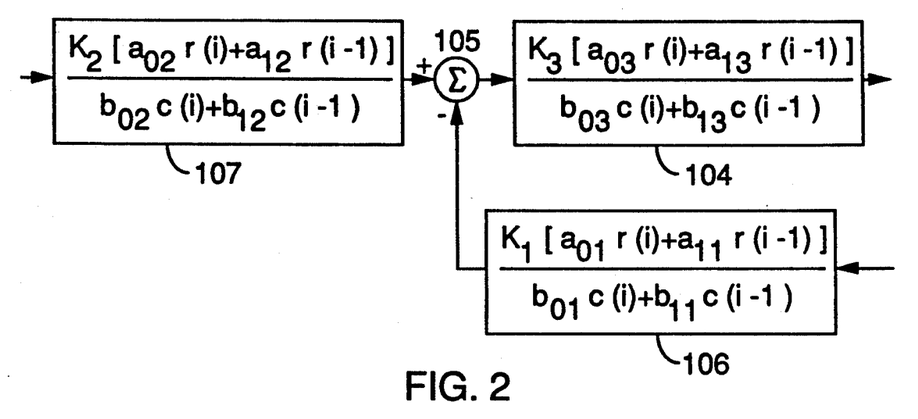
FIG. 2 is a functional block diagram of the digital servo system of FIG. 1.
Figure 4:
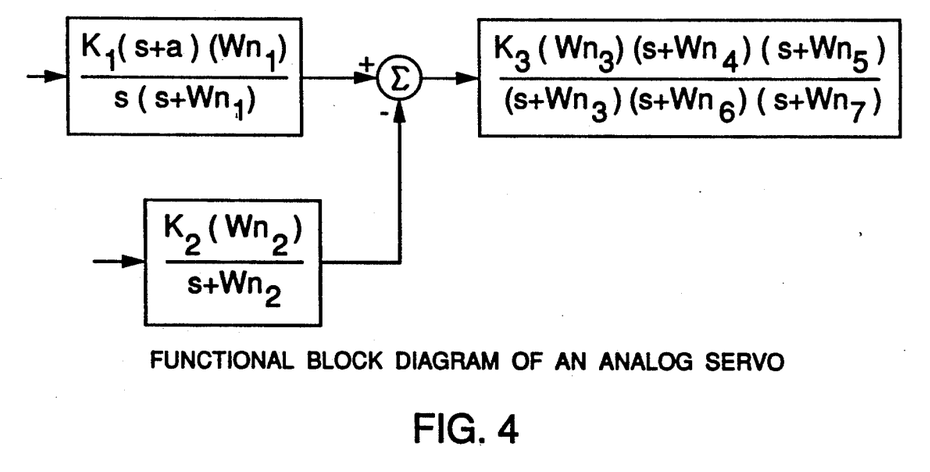
FIG. 4 is a functional block diagram of the analog servo control elements used in FIG. 3.

FIG. 2 is a functional block diagram of the digital servo elements used in FIG. 1. More specifically, FIG. 2 provides the equivalent electrical functional characteristics of the mount dynamics unit 104, rate Control unit 106 and the controller unit 107 of FIG. 1 as they interact with the summing junction 105. In FIGS. 2 and 4 the mathematical elements K1, K2, K3 represent their respective filter gains. Similarly, the listed "a" and "b" mathematical elements represent the filter component. The actual values of these elements will vary according to the application of the invention, and these design characteristics should be determined empirically for the specific application involved.

Figure 3:
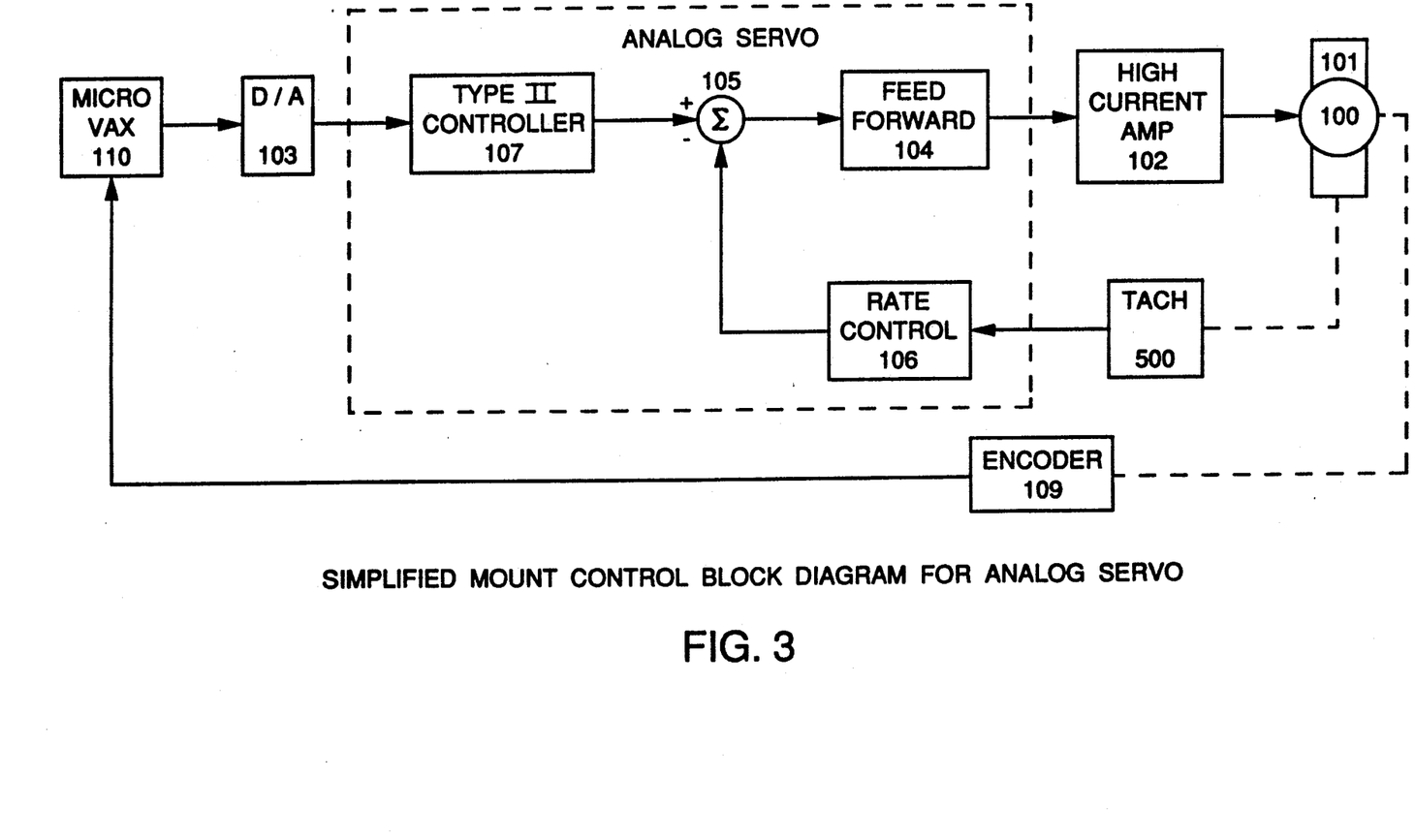
FIG. 3 is a block diagram of another embodiment of the invention which uses an analog servo control system; instead of the digital servo.

The reader's attention is now directed towards FIG. 3, which is a block diagram of another embodiment of the present invention. The system of FIG. 3 is an analog servo control system which includes a rotating axis mounted on a gimbal 100, a high torque motor 101, a high current amplifier 102, an encoder 109, a D/A converter 103, a mount dynamics 104, a summing junction 105, a rate control circuit 106, a controller circuit 107, a Micro Vax computer 110 and a tachometer 500.

All of the elements of FIG. 3 correspond with like enumerated elements in FIG. 1. In FIG. 3, the tachometer 500 is used to obtain an analog measurement of the actual velocity for the rate control circuit 106, while the encoder 109 measures the actual position of the pedestal, and outputs a digital signal to the computer 110.

FIG. 4 is a functional block diagram of the analog servo elements of FIG. 3. More specifically, FIG. 4 provides the electrical functional characteristics of the mount dynamics circuit 104, the rate control circuit 106, and the controller circuit 107 of FIG. 3 as they interact with the summing junction 105. As mentioned above, the mathematical elements K1, K2 and K3 of FIGS. 2 and 4 represent their respective filter gains.

Figure 5:
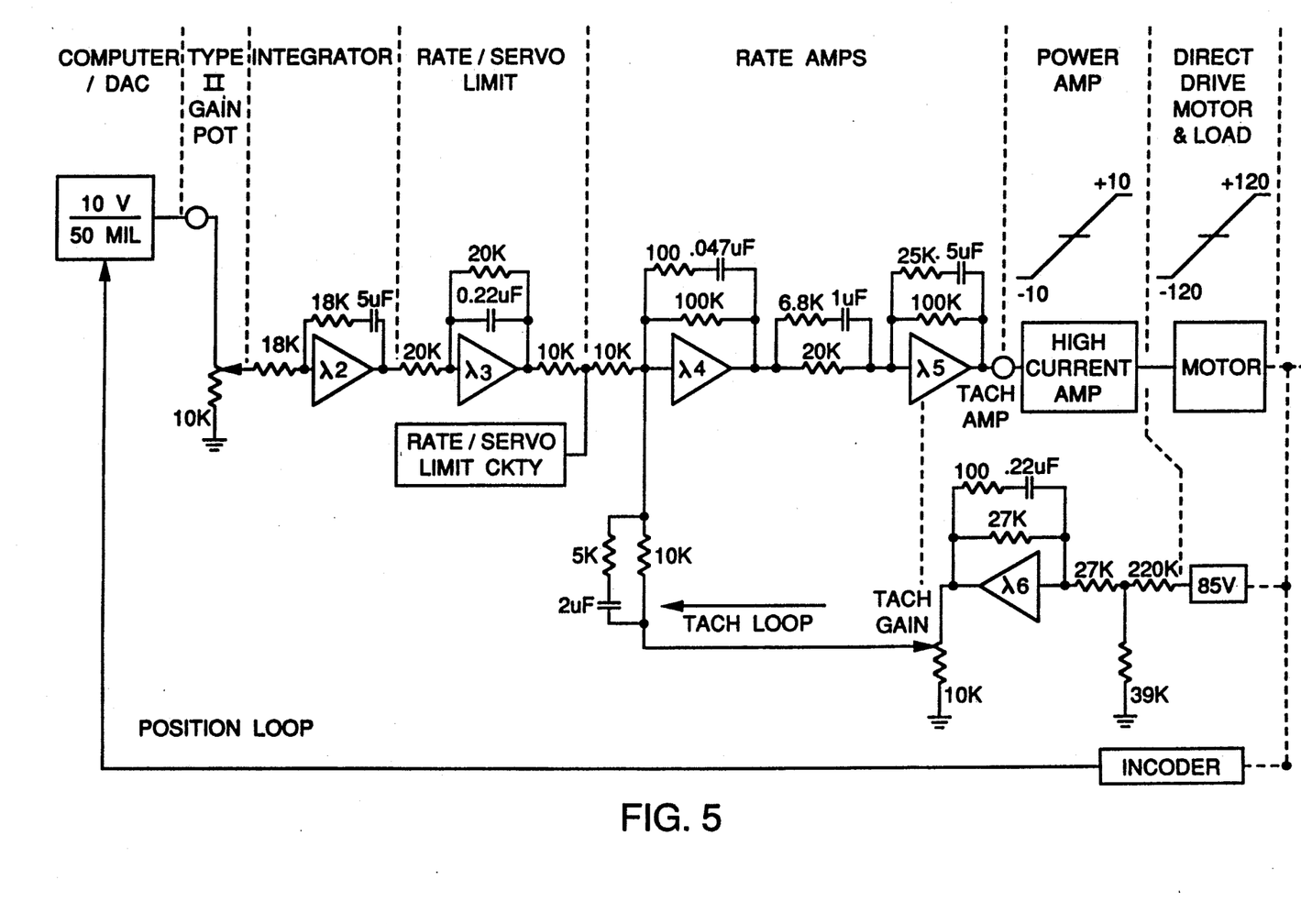
FIG. 5 is a circuit schematic of the analog servo control system of FIG. 3.
Figure 6:
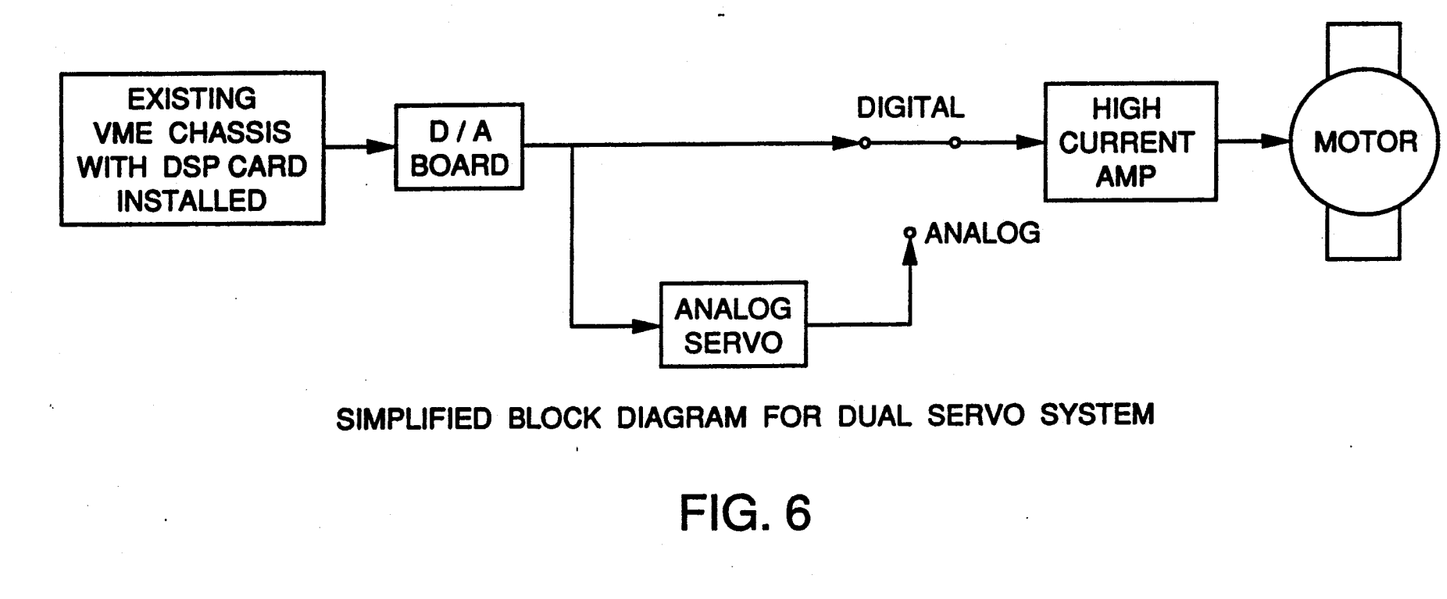
FIG. 6 is a block diagram of a dual servo control system.

FIG. 5 is an electrical schematic of the analog servo system of FIG. 3. FIG. 6 provides the values of some of the electrical components in one application of the analog servo system, and indicates the performance parameters of the power amplifier and high torque motor.

FIG. 6 is a block diagram for a dual servo system. As mentioned above, the systems of both FIGS. 1 and 3 provide servo control for the pointing of structures about 1 axis of rotation. The system of FIG. 6 uses either the digital servo of FIG. 1 or the analog servo of FIG. 3 to achieve single axis control. As shown in the above-cited Pohle et al patent, the tipping and tilting of an array about two axes of rotation allows the beam of a laser telescope to be steered in two dimensions. It should be noted that the system of FIG. 6 is intended to represent one example of a single axis control system. One digital servo control system or two analog servo control systems could also be used to achieve two axis control.

Figure 7:
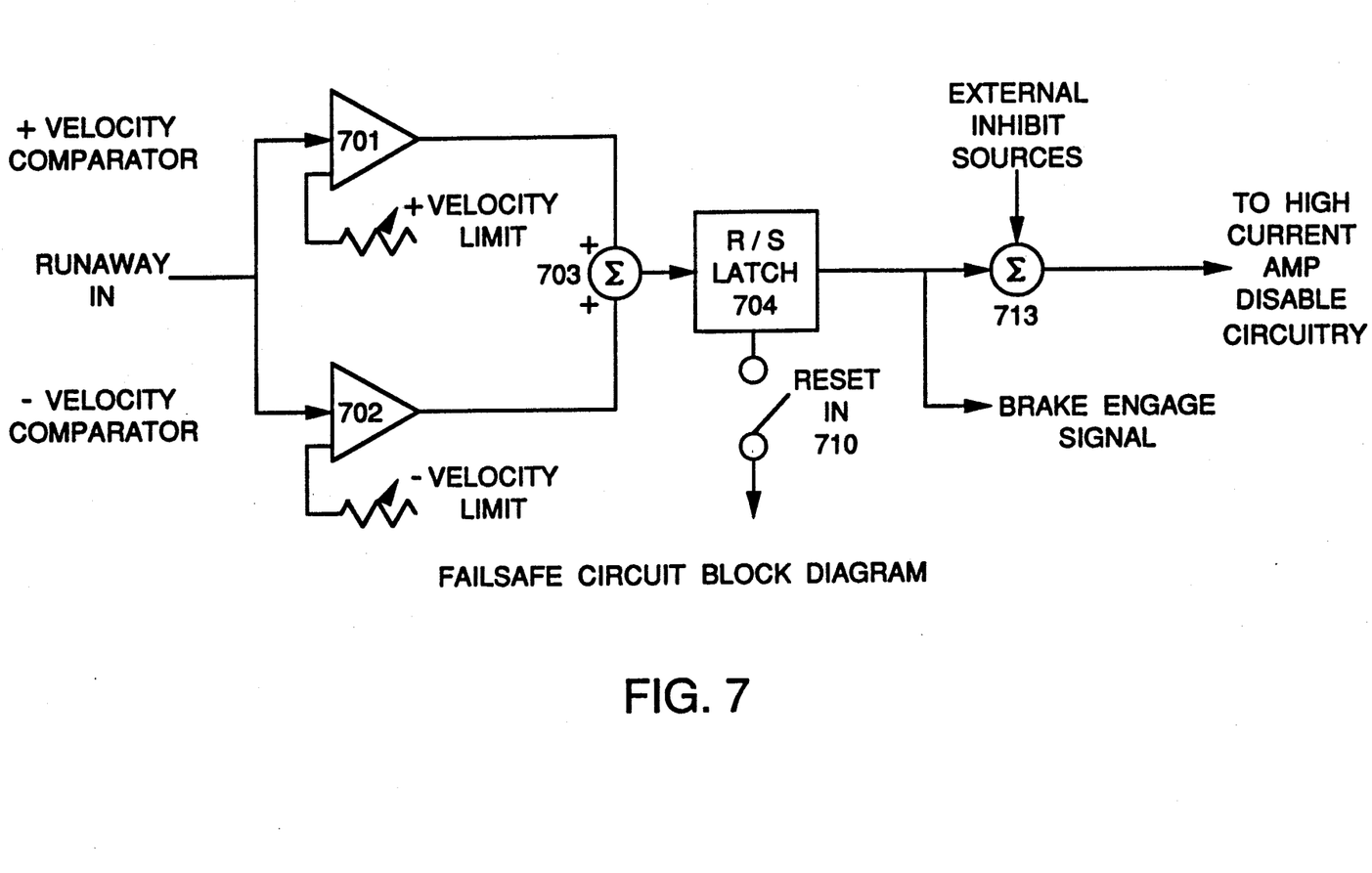
FIG. 7 is a block diagram of the failsafe circuit of the present invention.

FIG. 7 is a block diagram of the failsafe circuit that may be used with the system of FIGS. 1 or 3. This circuit monitors a "runaway" condition. If a runaway (excessive velocity) condition occurs, the circuitry shuts down the mount motor and engages the brake. Each axis is independent and has its own failsafe circuit and Analog/Digital switch.

The system of FIG. 7 uses: two comparator amplifiers 701 and 702, two summing junction 703 and 713, a latch circuit 704, and a reset switch 710.

Each of the comparator amplifiers produce an output signal by subtracting the actual velocity from the velocity limits. A "runaway" condition occurs when the actual velocity exceeds the velocity limit.

The first summing junction 703 acts as an "OR" gate, and only produces an output signal when either of the comparator amplifiers 701 and 702 indicate the presence of a "runaway" condition. The output of the first summing junction 703 is conducted by the latch circuit 704 to both, the pedestal brakes, and the second summing junction 713.

The second summing junction 713 also acts as an "OR" gate, and allows the users of the system to have the option of activating any disable circuitry of the high current amplifier. This "disable circuitry" can be simply a switch that cuts off power to the high current amplifier when activated.

As with most digital systems, a major reduction in hardware is an advantage of the invention. This equates to a large savings in manpower needed for adjustments, preventative maintenance, repair, and troubleshooting. The system that is currently operating under digital control is totally digital except for the high current amplifiers and the motors. The only system inputs required are the mount absolute position from the encoders, and the only outputs required are the drive to the high current amps. The electro-magnetic coupling associated with the tachometer has been eliminated, as well as its effects on the control loops. The need for specialized hardware manufacturing has also been eliminated. The hardware components of a digital servo are generic and can be purchased off the shelf. The uniqueness of the Digital Servo is purely in the software driving functions. Rate and acceleration control are only limited by the accuracy of the encoder information provided. A 21 bit encoder, for example, provides approximately +/−3 microradians tracking performance with the 21 bit encoders. The robustness of the system has been observed in the system currently operating. System order is not an issue for digital systems. The timing we are currently using takes approximately 18 microseconds/floating point operation. That means in 1 millisecond approximately 50 floating point operations could be performed (i.e. an additional 5 first order filters could be incorporated without affecting the current system timing). In the analog world any order above 4 becomes extremely cumbersome. In the digital world, with today's tools, it is simply a matter of typing in filter algorithms. Most filters or controllers can be designed, built, and implemented in minutes. The money saved in time alone would be astronomical.

Figure 8:
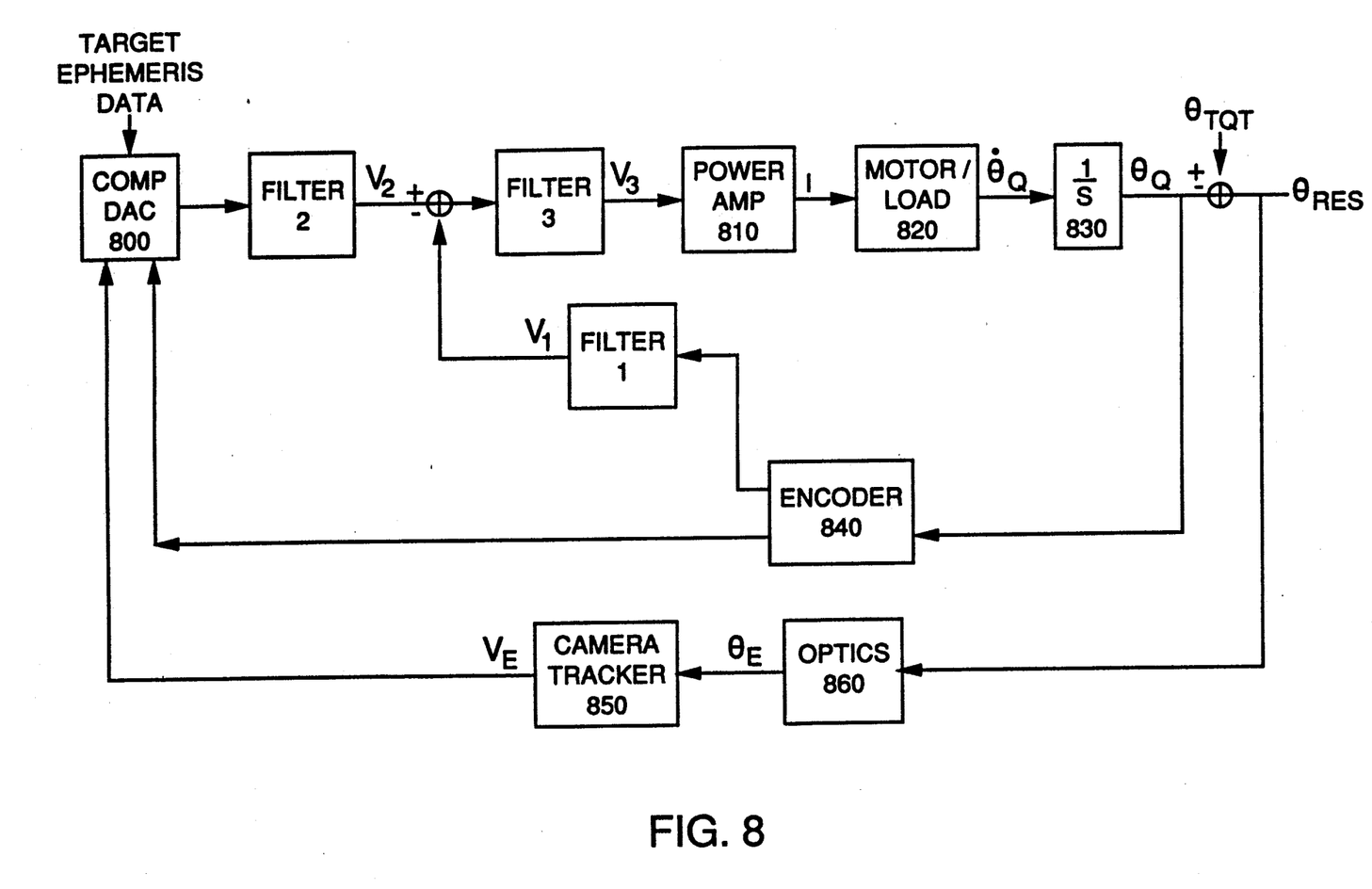
FIG. 8 is a block diagram of an implementation of the system of FIG. 1.

FIG. 8 is a block diagram of the implementation of the present invention in a fast steering mirror (FSM) gimbal system. The system consists of the power amplifier 810, motor/load 822, and integrator blocks 830. Although the integrator 830 is physically part of the motor/load, the motor/load and integrator are kept separate in the diagram to denote the accessability of azimuth and elevation tachometers to sense gimbal rates. Previous testing indicated that the outputs of these tachometers are not pure gimbal rates but rather rate coupled with motor drive current. Although rate estimates could be derived from filtered tachometer outputs, this approach is not used in this particular control system. Instead, gimbal rates are derived by differentiating and then filtering the encoder signal. This approach is also applicable to other mounts, some of which do not have tachometer sensors.

System filters are designed to provide compensation. Filter 1 generates a smoothed estimate of gimbal rate which is used for stability. Filter 2 implements type I or type II control, depending on the size of the ephemeris pointing error. Filter 3 is a low pass filter which prevents high frequency signals from entering the power amplifier. High frequency signals are further filtered in the power amplifier itself via analog filters. Details of the encoder and camera/tracker subsystems are discussed below.

As mentioned previously, there are three compensation filters for control of each of the gimbal axes. Filter 1 is a first order low pass filter which smooths the differenced encoder data. It has a corner frequency of 5 hz and a gain of 49.7 or 34 db. This filter operates at 100 hz, the same rate at which the encoder data is differenced in the RDAS.

Filters 2 and 3 operate at 1000 hz. Filter 2 controller is set to type I or II control based on the error between the designated angle and the encoder angle. If the error is greater than 25 mrad, Filter 2 is merely a gain. Since the open loop transfer function of the gimbal has a lone integrator in the denominator (i.e. the response to a step input is a constant angular rate), type I control is implemented. For errors less than 25 mrad, Filter 2 is a controller, thereby implementing type II control. Filter 3 is a simple first order low pass filter with a corner frequency of 20 hz and a gain 11.5 or 21.2 db.

When tracking targets such as launch vehicles or satellites, the gimbal system can operate in one of two modes. When the gimbal system is operated in the 'ephemeris' or 'open loop' track mode, the tracker is not activated. Instead, the gimbal uses encoder feedback to track target position as calculated by the ephemeris program. Ephemeris data accuracy is, in part, a function of the time elapsed since the last ephemeris update, but data is typically accurate enough to get the target within the boresight and Xybion camera fields of view (i.e. less than 2 or 3 mrad). Centering the target is then performed by the operator using a joy stick or offset arrows on the touch screen control panel.

When the gimbal operates in the 'tracker' or 'closed loop' mode, the tracker data is fed back along with the encoder output. As a result of the simultaneous encoder and tracker connections, type I/II control as implemented by Filter 2 in the ephemeris loop is n longer applicable. In order to re-establish type I control, the output of the tracker is fed to the Micro Vax computer through an Analog to Digital Converter (ADC) where it is integrated digitally. The integrated tracker error is added to the ephemeris and console commands as described above.

The computer architecture which implements the gimbal control system can best be described by following the path of gimbal servo commands from the Micro Vax to the gimbal servo and then following the paths of the encoder feedback data from the gimbal to the rate and ephemeris control loops. First, consider the path from the Micro Vax to the gimbal servo.

The Micro Vax computer uses the Real Time Control Program (RTCP) to calculate gimbal servo commands as a function of ephemeris commands, tracker commands and console commands. Ephemeris commands are calculated using an algorithm which determines the designated pointing vector as a function of satellite ephemeris and/or radar data along with the appropriate coordinate transformations. The difference between the designated vector and the actual pointing vector as specified by the gimbal encoders is calculated and added to static error corrections (gimbal sag, etc.) to give the ephemeris error. A 'push' term is then added to the ephemeris error to speed the response, resulting in ephemeris commands.

The camera/tracker system 850 used for any particular mission may be any one of several combinations. There are two cameras on the mount, a boresight camera and an intensified xybion camera. The boresight camera is typically used for daytime operations and tracking of very bright nighttime objects. The xybion camera is used for tracking nighttime objects but may be used for brighter objects if the aperture is reduced. Other cameras on the various optical benches are also available and are typically dedicated to specific users/missions.

The tracker is typically a standardized tracker, although there is an effort being made to incorporate a Data Cube tracker into the system. As mentioned previously, the tracker may be located at the gimbal or the console operator, depending on the system configuration. If an FSM is not part of the system, camera output is typically transmitted from T-1 over the fiber optics to a tracker located near the operater console. If an FSM is part of the system, the FSM position pickoffs are treated as the tracker outputs were treated in the previous case. Instead of offloading the tracker, the gimbal now offloads the FSM.

Tracker commands are determined by the camera/tracker subsystem 850 which is used to automatically compensate for ephemeris loop tracking errors, errors which may have occurred due to optical/gimbal axis misalignment, outdated satellite ephemeris data, radar error, etc. The camera may be located on the mount as are the boresight and Xybion cameras, or they may be on an optical bench which is typically the case for cameras which support specific experiments. If an FSM is part of the system, the tracker may be situated in either relocation since tracker signals are fed directly to the FSM. If an FSM is not part of the tracking system, the tracker signals are fed to the Micro Vax via a 14 bit A/D in the Console Control System (CCS). In the VAX, the track errors can be multiplied by gains expressed in the left/right and up/down camera axes (LR, UD) or the gimbal axes (AZ, EL). A transformation matrix transforms data from the camera coordinates to the gimbal coordinates. If the camera is located on the mount, this matrix is the identity matrix. A point ahead option is available if the pointing direction must compensate for transmission time, e.g. illuminator beam pointing. Finally, the track error is multiplied by a gain and integrated. The integrator may be reset to zero from the touch screen control panel.

Console commands are treated in a manner similar to the track errors. Commands are integrated, multiplied by the appropriate gains and then transformed to gimbal axes if necessary. As with the tracker data, the offset command for the integrator may be reset to zero.

As with the system of FIGS. 1 and 3, the digital signal processor (DSP) is a Texas Instrument TMS320C25 based processor which implements the compensation filters described previously. It also contains four Digital to Analog Converters (DAC's) used to drive the gimbal azimuth and elevation axes and, depending on the configuration, the FSM azimuth and elevation axes. The DSP software has been recently rewritten in the C programming language using floating point arithmetic. This new software essentially eliminates truncation error caused by the integer arithmetic used in the previous software and greatly simplifies the development of the Digital Control Interface (DCI). The DCI will enable the analyst to modify filter parameters and specify DSP DAC outputs via menu-driven software as well as obtain DSP time history data from the gimbal tests. This, along with a recently implemented dynamic targetboard, will reduce the turnaround time required for test setup, execution and analysis of results from hours to minutes.

Figure 9:
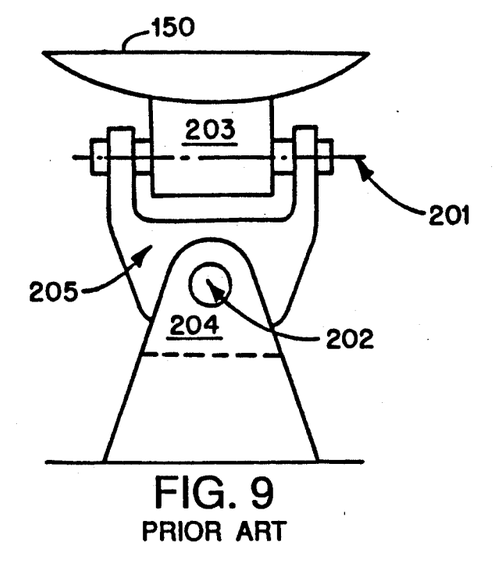
FIG. 9 is an illustration of a prior art gimbal system.
Figure 10:
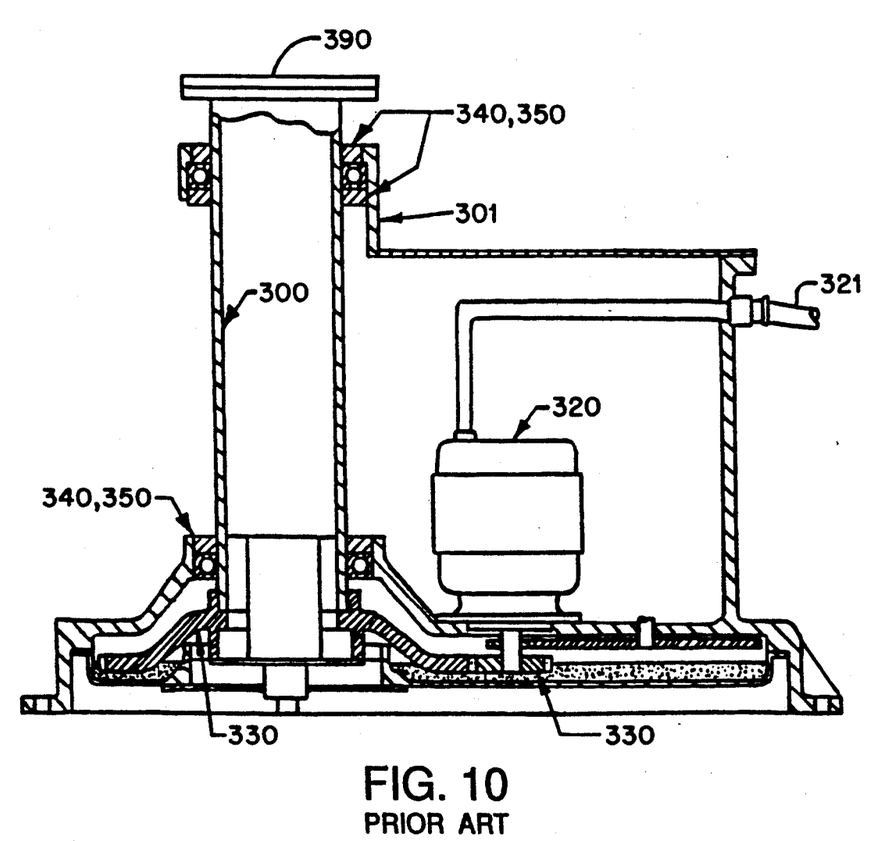
FIG. 10 is an illustration of a prior art gimbal drive system which may be used with the present invention.

To ensure the users of the present invention understand motor-driven gimbal systems, the reader's attention is now directed towards FIGS. 9 and 10. Note that the present invention is designed for use with optical mounts, such as that of the NIKE AJAX system. The array gimbal system of FIG. 9 is from a radar mount which does not need the accuracy that optical tracking mounts need.

The motor-driven gimbal system of FIG. 9 can serve as an array gimbal system. The motor driven gimbal system of FIG. 9 contains the following elements: an array housing 150, a first axle which serves as a roll axis 201, a second axle which serves as a pitch axis 202, a roll gimbal 203, a pitch bail 204, and roll bail 205. As shown in the above-cited Pohle et al reference, a bail is fork which supports an axle upon which something may be mounted. A gimbal is a ring which is usually mounted on a bail. The system of FIG. 9 contains two internal motor-driven servomechanisms within its housing to rotate the roll gimbal 203 about the roll axis 201, and to rotate the pitch bail 204 about the pitch axis 202. As an example of a suitable gimbal drive mechanism is illustrated in FIG. 10 and described below.

FIG. 10 is a schematic of a gimbal drive mechanism that can be housed in the roll gimbal 203 or the pitch bail 204 to tilt the gimbals about the roll axis 20 or pitch axis 202. The gimbal drive mechanism of FIG. 10 may be housed inside the bail 205 of the roll gimbal 203 of FIG. 2 in order to tilt the array housing 150 about the roll axis in the manner described below.

The reader's attention is now directed towards FIG. 10 which is a schematic of one of the gimbal drive mechanisms which may be used in the present invention. The torque tube 300 is connected to the gimbal fork base 390 which is adjacent to the bail. This torque tube services as the roll axis 201 and is driven by the motor drive 320 through the gear mechanism 330.

The entire assembly of FIG. 10 is housed in a housing 301 which forms the roll gimbal 203 of FIG. 9. The torque tube extends out of the housing through an I-ring slip assembly 340 and an oil seal 350. When the torque tube is rotated by the drive motor 320, it rotates the housing to precise angles abut the roll axis with respect to the gimbal fork base 390.

The referenced Microfiche Appendix contains a listing of the PDL code used by the DSP computer of FIGS. 1, and 3 that allow it to control the gimbal.

During the development of a digital servo prototype it was discovered that the complex transfer functions implemented in the analog servo were not needed. In fact, the simpler functions implemented in the operational digital servo yielded better results than its analog counterpart.

The Digital Servo was developed and tested using an operational mount. Because of the site requirements to maintain operational status, modifications were made to the current servo circuitry to accommodate both servos during the test phase of the digital system. FIG. 6 shows the simplified block diagram of the dual servo system. In addition to the drive control switch is a 'failsafe circuit.' This circuit, shown in FIG. 7, as described above.

Various tools were used during the development of the DSP software. One of these tools was MATRIXX, a Control System design and Analysis Package. MATRIXX was used to obtain the analysis information and to convert the LaPlace Transfer Functions into the Z Transform Functions. The Z transforms are discrete versions of an analog function. The relationship is as follows:

$$\frac{C(s)}{R(s)} = \frac{K\,wn}{s + wn} \xrightarrow{Z} \frac{C(s)}{R(z)} = \frac{K(a0^*z + a1)}{b0^*z + b1}$$

Where: $K$ = Gain  
$wn$ = frequency in Radians/Second  
$s$ = LaPlace Operator  
$C$ = Output Function  
$R$ = Input Function  
$z$ = Discrete Operator Since the configuration architecture was already determined, the sample rate was applied to the LaPlace functions to obtain the functions in Z, the discrete domain. The transformation of the Z function to the difference equation format is as follows:

$$\frac{C(z)}{R(z)} = \frac{K(a0^*z + a1)}{b0^*z + b1}$$

$$C(z) = [k(a0^*z + a1)\,R(z)]/(b0^*z + b1)$$
$$C(z)[b0^*z + b1] = k(a0^*z + a1)\,R(z)$$

Next, multiply both sides by $z - 1$, where $z - 1$ means $z$ raised to the $-1$ power:

$$b0^*c(0) + b1^*c(z - 1) = K(a0^*r(0) + a1^*r(z - 1))$$

Then:

-continued $$b0^*c(0) = k(a0^*r(0) + a1^*r(z - 1)) - b1^*c(z - 1)$$

Where: $c(0)$ = current output  
$c(z - 1)$ = previous output  
$r(0)$ = current input  
$r(z - 1)$ = previous input  
$a0, a1$ = numerator coefficients  
$b0, b1$ = denominator coefficients This represents the transformation of a Z transform to a difference equation for a first order case. It is obvious that the transformation can be continued for the nth order case as well, and is thoroughly documented in standard text books on control theory.

The initial integer version of the digital servo was developed primarily as a proof of concept, since so many previous attempts had failed. This version of the digital servo, although functional, was difficult to implement in assembly language and offered limited range on gain adjustments. Another limited feature of the integer version was the resolution. All calculations were limited to $+/-32767$. Processing time was not the limiting factor, but the level of effort to include higher level functions in assembly language was a major concern. Since this version spent most of the processing time waiting to perform the next iteration, floating point functions were the next logical step to include. The recommended embodiment is using the 'C' compiler and writing the software in 'C'. This already includes the higher level functions and took 6% of the estimated programming time to write partial functions in assembly language. Based on fixed update rates, an update rate for the Floating Point Digital Servo was determined to be 1 millisecond. Actual processing time was measured after the system became operational and only 53% of the 1 millisecond allotted was used for processing all algorithms for both axis. The main operating body of the software is as follows:

Note that the Microfiche Appendix also includes software for the digital servo, with this the servo can be operated as described above.

The remainder of the software including Programming Design Language (PDL) for the subroutines which is found in the Microfiche Appendix included in this document. The subroutines are predominantly written in assembly language and function as 'driver' for the particular interfaces. The idiosyncracies of both the hardware and the compiler encountered during the implementation phase were resolved with the use of the tools available and the expertise of the inventors. There were several issues during the implementation that were quickly resolved. One major issue was the ability to correctly set the gains. The initial method used was to digitize a voltage, convert to floating point, then divide by a scale factor. This method worked extremely well and provided gain values to 0.0001 accuracy. The recommended method is the upgrade to this using a 16 bit digital word instead of a voltage and an A/D converter. Another issue that arose dealt with the hardware limitations of the DSP board used in this system. This particular board has dual port program memory and dual port data memory, unfortunately only the program memory is accessible by the VME bus. Therefore, software had to be written that would transfer data to/from program memory from/to data memory, within the constraints of the compiler. This was accomplished and the 'driver' is included in the Microfiche Appendix.

The ongoing analysis effort has proven to be a major success factor during the design, development, and implementation of this project. During the development stage, many questions arose as to validity of the actual system performance. The models that are in the simulation of our mount and digital servo system provided answers to questions as they arose as well as insight to the next phase of development. With accurate models, the implementation was given initial values that allowed a stable starting point for closed loop mount operation. The actual transfer functions of the digital servo and the analysis models are included in the software code for comparison.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A digital servomechanism and control system, for controlling the pointing of a mechanical structure, said digital servomechanism and control system comprising:
   a rotary gimbal which is fixed to said mechanical structure and which may be driven in response to a stream of digital data signals to point the mechanical structure;
   an electric motor which is mechanically interconnected with said rotary gimbal to drive it in response to an amount of electric current which the electric motor receives;
   a means for generating said stream of digital data signals;
   a digital-to-analog converter unit which receives and converts digital control signals into analog electric control signals;
   a high current amplifier which is electrically connected between said digital-to-analog converter and said electric motor in order to supply said electric current to said electric motor in amounts governed by said stream of digital data signals, said high current amplifier producing said electric current for said electric motor by amplifying said analog electric control signals;
   a summing junction which produces said digital control signals by subtracting a digital rate error signal from a digital engine velocity signal, said digital engine velocity signal representing an ideal value of engine velocity said electric motor must achieve to cause said mechanical structure to be pointed as desired, said rate error signal being a measurement of an amount of engine velocity said electric motor would be operating above its operable limit if said ideal value of engine velocity were implemented;
   a means for measuring said rate error signal which is electrically connected between said electric motor and said summing junction;
   and a means for processing said stream of digital data signals from said generating means into said digital engine velocity signal for said summing junction, wherein said processing means comprises an integrator circuit which is electrically connected between said summing junction and said generating means, said integrator circuit producing said digital engine velocity signal by integrating said stream of digital data signals.

2. A digital servomechanism and control system for controlling the pointing of a mechanical structure, said digital servomechanism and control system comprising:
   a rotary gimbal which is fixed to said mechanical structure and which may be driven in response to a storm of digital data signals to point the mechanical structure;
   an electric motor which is mechanically interconnected with said rotary gimbal to drive it in response to an amount of electric current which the electric motor receives;
   a means for generating said stream of digital data signals, wherein said generating means comprises a microprocessor which is programmed to output said stream of digital data signals in response to user commands;
   a digital-to-analog converter unit which receives and converts digital control signals into analog electric control signals;
   a high current amplifier which is electrically connected between said digital-to-analog converter and said electric motor in order to supply said electric current to said electric motor in order to supply said electric current to said electric motor in amounts governed by said stream of digital data signals, said high current amplifier producing said electric current for said electric motor by amplifying said analog electric control signals;
   a summing junction which produces said digital control signals by subtracting a digital rate error signal from a digital engine velocity signal, said digital engine velocity signal representing an ideal value of engine velocity said electric motor must achieve to cause said mechanical structure to be pointed as desired, said rate error signal being a measurement of an amount of engine velocity said electric motor would be operating above its operable limit if said ideal value of engine velocity were implemented;
   a means for measuring said rate error signal which si electrically connected between said electric motor and said summing junction; and
   a means for processing said stream of digital data signals form said generating means into said digital engine velocity signal for said summing junction, wherein said processing means comprises an integrator circuit which is electrically connected between said summing junction and said generating means, said integrator circuit producing said digital engine velocity signal by integrating said stream of digital data signals.

3. A digital servomechanism and control system, for controlling the pointing of a mechanical structure, said digital servomechanism and control system comprising:
   a rotary gimbal which is fixed to said mechanical structure and which may be driven in response to a stream of digital data signals to point the mechanical structure;
   an electric motor which is mechanically interconnected with said rotary gimbal to drive it in response to an amount of electric current which the electric motor receives;
   a means for generating said stream of digital data signals;
   a digital-to-analog converter unit which receives and converts digital control signals into analog electric control signals;

a high current amplifier which is electrically connected between said digital-to-analog converter and said electric motor in order to supply said electric current to said electric motor in amounts governed by said stream of digital data signals, said high current amplifier producing said electric current for said electric motor by amplifying said analog electric control signals;

a summing junction which produces said digital control signals by subtracting a digital rate error signal from a digital engine velocity signal, said digital engine velocity signal representing an ideal value of engine velocity said electric motor must achieve to cause said mechanical structure to be pointed as desired, said rate error signal being a measurement of an amount of engine velocity said electric motor would be operating above its operable limit if said ideal value of engine velocity were implemented;

an encoder circuit which measures each position of said rotary gimbal over successive intervals of time to produce a series of position measurements;

a calculating circuit which produces a velocity measurement signal by calculating a derivative of said series of position measurements received from said encoder circuit;

a rate control comparator circuit which is electrically connected between said calculating circuit and said summing junction, and which produces said rate error signal by comparing said velocity measurement from said calculating circuit with a stored operable limit value above which said electric motor should not run; and a means for processing said stream of digital data signals from said generating means into said digital engine velocity signal for said summing junction.

4. A digital servomechanism and control system for controlling the pointing of a mechanical structure, said digital servomechanism and control system comprising:

a rotary gimbal which is fixed to said mechanical structure and which may be driven in response to a stream of digital data signals to point the mechanical structure;

an electric motor which is mechanically interconnected with said rotary gimbal to drive it in response to an amount of electric current which the electric motor receives;

a means for generating said stream of digital data signals, wherein said generating means comprises a microprocessor which is programmed to output said stream of digital data signals in response to user commands;

a digital-to-analog converter unit which receives and converts digital control signals into analog electric control signals;

a high current amplifier which is electrically connected between said digital-to-analog converter and said electric motor in order to supply said electric current to said electric motor in amounts governed by said stream of digital data signals, said high current amplifier producing said electric current for said electric motor by amplifying said analog electric control signals;

a summing junction which produces said digital control signals by subtracting a digital rate error signal from a digital engine velocity signal, said digital engine velocity signal representing an ideal value of engine velocity said electric motor must achieve to cause said mechanical structure to be pointed as desired, said rate error signal being a measurement of an amount of engine velocity said electric motor would be operating above its operable limit if said ideal value of engine velocity were implemented;

an encoder circuit which measures each position of said rotary gimbal over successive intervals of time to produce a series of position measurements;

a calculating circuit which produces a velocity measurement signal by calculating a derivative of said series of position measurements received from said encoder circuit;

a rate control comparator circuit which is electrically connected between said calculating circuit and said summing junction, and which produces said rate error signal by comparing said velocity measurement from said calculating circuit with a stored operable limit value above which said electric motor should not run; and a means for processing said stream of digital data signals from said generating means into said digital engine velocity signal for said summing junction.

5. A digital servomechanism and control system, as defined in claim 1, wherein said measuring means comprises:

an encoder circuit measures each position of said rotary gimbal over successive intervals of time to produce a series of position measurements;

a calculating circuit which produces a velocity measurement signal by calculating a derivative of said series of position measurements received from said encoder circuit; and a rate control comparator circuit which is electrically connected between said calculating circuit and said summing junction, and which produces said rate error signal by comparing said velocity measurement from said calculating circuit with a stored operable limit value above which said electric motor should not run.

6. A digital servomechanism and control system, as defined in claim 2, wherein said measuring means comprises:

an encoder circuit measures each position of said rotary gimbal over successive intervals of time to produce a series of position measurements;

a calculating circuit which produces a velocity measurement signal by calculating a derivative of said series of position measurements received from said encoder circuit; and a rate control comparator circuit which is electrically connected between said calculating circuit and said summing junction, and which produces said rate error signal by comparing said velocity measurement from said calculating circuit with a stored operable limit value above which said electric motor should not run.

7. A digital servomechanism and control system for controlling the pointing of a mechanical structure, said digital servomechanism and control system comprising:

a rotary gimbal which is fixed to said mechanical structure and which may be driven in response to a stream of digital data signals to point the mechanical structure;

an electric motor which is mechanically interconnected with said rotary gimbal to drive it in response to an amount of electric current which the electric motor receives;

a means for generating said stream of digital data signals;

a digital-to-analog converter unit which receives and converts digital control signals into analog electric control signals;

a high current amplifier which is electrically connected between said digital-to-analog converter and said electric motor in order to supply said electric current to said electric motor in amounts governed by said stream of digital data signals, said high current amplifier producing said electric current for said electric motor by amplifying said analog electric control signals;

a summing junction which produces said digital control signals by subtracting a digital rate error signal from a digital engine velocity signal, said digital engine velocity signal representing an ideal value of engine velocity said electric motor must achieve to case said mechanical structure to be pointed as desired, said rate error signal being a measurement of an amount of engine velocity said electric motor would be operating above its operable limit if said ideal value of engine velocity were implemented;

a tachometer which is connected to said electric motor, and which produces an output signal by measuring the electric motor's actual engine velocity;

a rate control comparator circuit which is electrically connected between said tachometer and said summing junction, and which produces said rate error signal by comparing said output signal of said tachometer with a stored operable limit value above which said electric motor should not run; and a means for processing said stream of digital data signals from said generating means into said digital engine velocity signal for said summing junction wherein said processing means comprises an integrator circuit which is electrically connected between said summing junction and said generating means, said integrator circuit producing said digital engine velocity signal by integrating said stream of digital data signals.

8. A digital servomechanism and control system for controlling the pointing of a mechanical structure, said digital servomechanism and control system comprising:

a rotary gimbal which is fixed to said mechanical structure and which may be driven in response to a stream of digital data signals to point the mechanical structure;

an electric motor which si mechanically interconnected with said rotary gimbal to drive it in response to an amount of electric current which the electric motor receives;

a means for generating said stream of digital data signals, wherein said generating means comprises a microprocessor which is programmed to output said stream of digital data signals in response to user commands;

a digital-to-analog converter unit which receives and converts digital control signals into analog electric control signals;

a high current amplifier which is electrically connected between said digital-to-analog converter and said electric motor in order to supply said electric current to said electric motor in amounts governed by said stream of digital data signals, said high current amplifier producing said electric current for said electric motor by amplifying said analog electric control signals;

a summing junction which produces said digital control signals by subtracting a digital rate error signal from a digital engine velocity signal, said digital engine velocity signal representing an ideal value of engine velocity said electric motor must achieve to cause said mechanical structure to be pointed as desired, said rate error signal being a measurement of an amount of engine velocity said electric motor would be operating above its operable limit if said ideal value of engine velocity were implemented;

a tachometer which is connected to said electric motor, and which produces an output signal by measuring the electric motor's actual engine velocity;

a rate control comparator circuit which is electrically connected between said tachometer and said summing junction, and which produces said rate error signal by comparing said output signal of said tachometer with a stored operable limit value above which said electric motor should not run; and a means for processing said stream of digital data signals from said generating means into said digital engine velocity signal for said summing junction wherein said processing means comprises an integrator circuit which is electrically connected between said summing junction and said generating means, said integrator circuit producing said digital engine velocity signal by integrating said stream of digital data signals.

9. A digital servomechanism and control system, as defined in claim 1, wherein said measuring means comprises:

a tachometer which is connected to said electric motor, and which produces an output signal by measuring the electric motor's actual engine velocity; and a rate control comparator circuit which is electrically connected between said tachometer and said summing junction, and which produces said rate error signal by comparing said output signal of said tachometer with a stored operable limit value above which said electric motor should not run.

10. A digital servomechanism and control system, as defined in claim 2, wherein said measuring means comprises:

a tachometer which si connected to said electric motor, and which produces an output signal by measuring the electric motor's actual engine velocity; and a rate control comparator circuit which is electrically connected between said tachometer and said summing junction, and which produces said rate error signal by comparing said output signal of said tachometer with a stored operable limit value above which said electric motor should not run.

* * * * *